United States Patent [19]

Cuadrado et al.

[11] Patent Number: 5,738,900
[45] Date of Patent: Apr. 14, 1998

[54] PROCESS FOR MAKING A READILY-DISPERSIBLE, DRY FOOD MIX

[75] Inventors: Xavier A. Cuadrado, New York; Christopher J. Scinto, Tarrytown, both of N.Y.; Gail S. Conti, Stamford, Conn.; Steven J. Leusner, Orono, Minn.

[73] Assignee: Kraft Foods, Inc., Northfield, Ill.

[21] Appl. No.: 708,085

[22] Filed: Aug. 30, 1996

[51] Int. Cl.$^6$ .................................................. A23L 1/187
[52] U.S. Cl. ........................................ 426/658; 426/555
[58] Field of Search .................. 426/96, 103, 285, 426/594, 595, 596, 658, 578, 579, 591, 555, 593, 570

[56] References Cited

U.S. PATENT DOCUMENTS

| | | | |
|---|---|---|---|
| 2,850,388 | 9/1958 | Peebles | 426/593 |
| 3,028,242 | 4/1962 | Hale | 426/593 |
| 3,053,663 | 9/1962 | Donahue | 426/593 |
| 3,100,909 | 8/1963 | Shapiro | 99/78 |
| 3,395,213 | 7/1968 | Rieckmann | 426/103 |
| 3,507,665 | 4/1970 | Henthorn | 426/658 |
| 3,580,726 | 5/1971 | Dame | 426/285 |
| 3,627,583 | 12/1971 | Troy | 426/285 |
| 4,006,262 | 2/1977 | Smith et al. | 426/573 |
| 4,215,152 | 7/1980 | O'Rourke | 426/579 |
| 4,338,350 | 7/1982 | Chen | 426/555 |
| 4,343,819 | 8/1982 | Wood et al. | 426/96 |
| 4,539,215 | 9/1985 | Schwerd | 426/579 |
| 4,702,925 | 10/1987 | Verrico | 426/96 |
| 4,737,368 | 4/1988 | Batterman | 426/579 |
| 4,871,398 | 10/1989 | Katcher et al. | 127/71 |
| 4,944,955 | 7/1990 | Bassa et al. | 426/579 |
| 5,338,555 | 8/1994 | Caly et al. | 426/96 |

OTHER PUBLICATIONS

21 CFR 172.836–844 pp. 73–79 1983.

*Primary Examiner*—Carolyn Paden
*Attorney, Agent, or Firm*—Thomas R. Savoie; Thomas A. Marcoux

[57] ABSTRACT

A readily dispersible, sugar-containing food mix is prepared by applying a coating of glycerin and polysorbate onto the surface of the sugar and then blending with the remaining ingredients. The coating should contain at least 60% glycerin and at least 5% polysorbate and be applied to the sugar at a level of at least 0.6% by weight.

13 Claims, No Drawings

PROCESS FOR MAKING A READILY-DISPERSIBLE, DRY FOOD MIX

BACKGROUND OF THE INVENTION

Dry, sugar-containing food dry mixes which are intended to be dispersed in aqueous fluids by the consumer to produce a finished comestible are well known. These mixes provide an economical means for providing food products to consumers, as compared to distribution and sale of ready-to-eat or ready-to-drink food products. One concern with the use of dry food mixes is, however, the difficulty of rapidly dispersing the ingredients in the aqueous fluid, particularly in cold fluids, such as water and milk.

Dry mixes for producing single-serving portions instant puddings or instant beverages are usually intended to be dispersed into the aqueous fluid by stirring with a spoon in a relatively small container (e.g., bowl or a cup). Thus, dry mixes intended to be reconstituted in an aqueous fluid in single-serving amounts, such that the food product is both prepared in and consumed from a single serving container, need to be more readily dispersible than if the mix is reconstituted in a large bowl where a wire whisk or electric mixer may be employed to facilitate rapid dispersion.

Dispersibility of dry food mixes, including beverage mixes, is made even more difficult when the mix contains cocoa powder as an ingredient. Cocoa powder is known to be a material which is difficult to disperse. The use of lecthinated cocoa is known to ameliorate the problem; however, there is still a need for improving the dispersibility of dry food mixes, particularly cocoa powder-containing food mixes.

SUMMARY OF THE INVENTION

The dispersibility of dry, sugar-containing food mixes is improved by applying a liquid mixture to the surface of granular sugar, the mixture being comprised of at least 60% glycerin and at least 5% polysorbate. Particulate components are then blended with the coated, granular sugar so that the majority of the particulates adhere to the coated sugar granules. The particulate components should have an average particle size which is less than that of the sugar. Sugars will be the major component in the dry mix and the particulate components are each moner components of the dry mix. Sugar should constitute at least 40% of the dry mix and typically will be at least about 50% of the dry mix.

The process of the invention is exceedingly economical, as it can take place in existing blending equipment and very little additional equipment will need to be purchased. The process, along with improving the dispersiblity of the dry mix, will also reduce segregation within the dry mix and reduce the dustiness of the dry mix.

The liquid mixture which is applied to the surface of the granular sucrose my be sprayed on using a conventional means, such as spray nozzles. This may also be done within a blender, such as a ribbon blender. According to such a procedure, sugar would be introduced to the blender and while sugar is being subjected to blending, the liquid mixture is sprayed, drizzled or poured onto the sugar material. After introduction of the liquid mixture is complete, the particulate components are introduced into the blender, either together or in any desired order. If the dry mix is to contain other granular ingredients or any ingredients which might be adversely affected by prolonged blending, such as agglomerated starch in the case of an instant pudding mix or spray-dried creamer in the case of hot beverage mixes, it would be desirable to introduce these ingredients into the blender at the end of the blending cycle.

The glycerol-polysorbate mixture should be coated onto the surface of the sugar at a level of at least 0.6% by weight of the sugar, with a range of 1–4% being typical. The preferred polysorbate is polysorbate 60, otherwise know as polyoxyethylene (20) sorbitan monstearate. Polysorbates can be broadly described as polyoxyethylene fatty acid esters obtained by the esterification of sorbitol with one or three molecules of a fatty acid under conditions which cause splitting out of water from the sorbitol.

The granular sugar component should be sized such that at least 40%, preferably at least 50%, of the material is retained on a U.S. Standard Sieve No. 60. The particulate components should desirably have an average particle size of less than 149 microns.

Unless otherwise indicated all percents recited in the description and claims are weight percents.

This invention is further described with specific reference to instant pudding mixes and hot beverage mixes; however the invention is not limited thereto.

DESCRIPTION OF THE PREFERRED EMBODIMENTS

The dry mixes of this invention typically contain about 50% granular sugar. The sugar component is coated with from 0.3 to 3% of a mixture of glycerin-polysorbate with this mixture containing at least 60% glycerin and at least 5% polysorbate. Preferred levels for mixture are 0.5 to 2%, most preferably 0.6 to 1% by weight of the sugar. Preferred compositions for the mixture are at least 70% glycerin and at least 10% polysorbate, with a composition of about 80% glycerin and about 20% polysorbate being most preferred.

The preferred polysorbate is polysorbate 60. Other polysorbates, such as polysorbate 20 (polyoxyethylene 20 sorbitan monolacate), polysorbate 40 (polyoxyethylene 20 sorbitan monopalmitate), polysorbate 60 (polyoxyethylene sorbitan tristearate), polysorbate 80 (polyoryethylene) 20 sorbitan mono-oleate and polysorbate 85 (polyoxyethylene) 20 sorbitan trioleate should also function satisfactorily.

The glycerin-polysorbate mixture may also contain an amount of monoglyceride in order to substantially eliminate foaming which could occur when they dry mix is dispersed into the aqueous fluid. Commercial emulsifiers containing a mixture of mono-and diglycerides are suitable for this purpose. The use level for the monoglyceride is typically up to about 1% by weight of the sugar.

The food mixes will typically contain other functional ingredients such as flavor and color agents, flow agents, buffers, gums, and the like. In the case of instant pudding mixes, along with the previously mentioned pregelatinized starch, phosphate setting salts will be included in the formulation, as is well known in the art.

EXAMPLE 1

| Ingredient | Parts by Weight | Preferred Range |
| --- | --- | --- |
| Sugar, Granular | 66.8 | 50–80% |
| Agglomerated Starch | 19.4 | 12–28% |
| Lecithinated Cocoa Powder | 7.2 | 3–15% |
| Phosphate Salts | 3.9 | 2–5% |
| Glycerin | 0.64 | 0.4–3%* |
| Polysorbate 60 | 0.16 | 0.03–0.7%* |
| Flavor & Color Agents/Salts | 1.8 | (as desired) |

*by weight of sugar

A chocolate-flavored, spoon-dispersible, instant pudding mix is prepared using the above ingredients at the recited parts by weight levels and following the procedure recited below.

The granular sugar, having a particle size wherein at least 50% by weight of the material is retained on a U.S. Standard Sieve No. 60, is placed in a ribbon blender. With the blender in operation, the glycerin/polysorbate (80:20 ratio) mixture is sprayed onto the sugar and blending is continued for 7 minutes. The color and flavor agents are then added and blended for 2 minutes. Next, the cocoa powder is added and blended for 7 minutes; then, the salts are added and blending continued for an additional 10 minutes. Finally, the agglomerated starch is added and blended for five minutes.

The resulting mix (27.6 g) was able to be dispersed in a cup containing cold, 2% fat milk (118 ml) by stirring with a spoon for about one minute until smooth. The mix was then refrigerated for five minutes resulting in a one-serving amount of chocolate flavored pudding which had a smooth texture and a desirable, glossy surface.

A second, chocolate pudding formulation was prepared as above employing glycerin and polysorbate 60 (95:5 ration) at levels of 0.75 and 0.04 parts by weight, respectively. The prepared pudding exhibited no visible clumps of undispersed material, but overall was somewhat less preferred than the first sample.

A third chocolate pudding formulation, again using a 95:5 glycerin: polysorbate ratio, but at a level of only 0.43 parts by weight produced a pudding which did show visible clumps. Polysorbate at a level above about 0.02% (about 0.03% by weight of the sugar) is thus seen to be critical to this invention.

Use of a mono-diglyceride emulsifier as a 1:1 replacement for the polysorbate in the first pudding formulation results in a pudding which also exhibits clumping.

EXAMPLE 2

A study was conducted to test the application of various coatings applied to the surface of the sugar component of a chocolate-flavored, instant pudding mix having the following formulation.

| Ingredient | Parts by Weight |
|---|---|
| Sugar, Granular | 66.76 |
| Agglomerated Starch | 19.39 |
| Lecithinated Cocoa Powder | 7.22 |
| Phosphate Salts | 3.94 |
| Coating Variants | 0.87 |
| Flavor/Salt/Color/Opacifier | 1.82 |

The pudding mix was prepared in 1000 g batches in a 5 quarter Holbert® mixer using a procedure comparable to that described in Example 1. The various coatings evaluated were as follows:

| Sample No. | Coating |
|---|---|
| 1. | Glycerin (72.9%), Polysorbate 60 (18.2%), Blended Mono-, Diglycerides (8.9%) |
| 2. | Distilled Acetylated Monoglycerides |
| 3. | Hydrogenated Soybean Oil (71.5%), Blended Mono-, Diglycerides (28.5%) |
| 4. | Distilled Monoglyceride (≧90% alpha mono ester content) |
| 5. | Sodium Stearoyl Lactylate |
| 6. | Ethoxylated Monoglyceride |
| 7. | Glycerin (80%), Sodium Stearoyl Lactylate (20%) |
| 8. | Glycerin (80%), Ethoxylated Monoglyceride (20%) |
| 9. | Glycerin (80%), Polysorbate 80 (20%) |

The pudding mixes were evaluated for ease of dispersion by stirring 27.7 g of the mix into 118 ml of cold, 2% fat in a 266 ml plastic cup. Stirring was done with a spoon for a period of one minute. The puddings were allowed to fully set in a refrigerator and, thereafter, visually evaluated for lumps on the surface and within the interior of the set pudding. The results were as follows:

| Samples | Surface Appearance |
|---|---|
| 1,8,9 | Clear, with 1 or 2 spots |
| 2,3 | Several small spots |
| 5,6,7 | Many large spots |
| 4 | Covered with small spots |

| Samples | Interior Appearance |
|---|---|
| 1 | Smooth |
| 3,4,9 | Fairly smooth |
| 2,5,6,7,8 | Somewhat chunky |

Based on the above observations the glycerin polysorbate 60 coating (Sample 1) was judged to be the best and the glycerin-polysorbate 80 coating (Sample 9) was judged to be second best.

EXAMPLE 3

| Ingredient | Parts by Weight | Preferred Range |
|---|---|---|
| Sugar, Granular | 969.6 | 30–60% |
| Spray-Dried Non Dairy Creamer | 749.4 | 25–50% |
| Soluble Coffee Solids | 13.42 | 3–15% |
| Trisoduim Citrate | 27.8 | 0.5–3% |
| Glycerin | 16.0 | 0.4–3%* |
| Polysorbate 60 | 4.0 | 0.03–0.7%* |
| Natural and Artificial Flavors | 114.6 | (as desired) |
| Silicon Dioxide | 4.6 | 0.1–0.8% |

*by weight of sugar

A French-vanilla-flavored soluble coffee mix was prepared using the above ingredients at the recited parts by weight levels following the procedure recited below.

A ribbon blender containing the sugar is turned on and the glycerin/polysorbate 60 mixture is drizzled onto the sugar. After 10 minutes of mixing the sucrose became tacky. The coffee solids, trisodum citrate, flavors and silicon dioxide were added and blended for 5 minutes. Lastly, the non-dairy creamer was added and blended for 10 minutes.

13 g of the resulting mix was stirred into 236 ml of hot (at least 82° C.) water using a spoon and minimal stirring. As compared to a dry-blended mix of the above solid ingredients, the agglomerated mixture of this Example had a dissolution rate of 23 seconds versus 46 seconds for the dry-blended mix. The dissolution rate was determined as the time needed to dissolve 90% of the material at 82° C. using a standardized stirring protocol.

Having thus describe the invention, what is claimed is:

1. A method for making a dry, readily-dispersible, sugar-containing food mix comprising the steps of:

a) adding granular sugar to a mixer;

b) applying a liquid mixture onto the surface of the granular sugar, said mixture comprised of at least 60% glycerin and at least 5% polysorbate; thereafter, c) adding particulate components to the mixer, said particulate components having an average particle size less than that of the granular sugar; and d) mixing the mixture of step c) in order to adhere the particulate components onto the surface of the sugar granules.

2. The method of claim 1 wherein the liquid mixture consists of glycerin and polysorbate.

3. The method of claim 1 wherein the liquid mixture contains at least 70% glycerin and at least 10% polysorbate.

4. The method of claim 1 wherein the liquid mixture contains about 80% glycerin and about 20% polysorbate 60.

5. The method of claim 1 wherein the liquid mixture is applied to the sugar at a level of at least 0.6% by weight of the sugar.

6. The method of claim 5 wherein the liquid mixture is sprayed onto the surface of the sugar.

7. The method of claim 1 wherein the sugar has a particle size distribution wherein at least 40% is retained on a No.60 mesh U.S. Standard Sieve.

8. The method of claim 7 wherein the particulate components have an average particle size of less than 149 microns.

9. The method of claim 1 wherein the dry food mix is a dry, instant pudding mix, and following step d), an agglomerated, pregelatinized starch material is added to the mixer and mixed.

10. The method of claim 9 wherein the instant pudding mix comprises:

50–80% granular sugar

12–28% agglomerated, pregelatinized starch

2–5% phosphate salts 0.4–3% glycerol (by weight of sugar).

0.03–0.7% polysorbate (by weight of sugar).

11. The method of claim 10 wherein the instant pudding mix further comprises 3–15% lecithinated cocoa powder.

12. The method of claim 1 wherein the dry food mix is a flavored, soluble coffee mix and following step d) a spray-dried creamer material is added to the mixer and mixed.

13. The method of claim 12 wherein the flavored, soluble coffee mix comprises:

30–60% granular sugar

25–50% spray dried creamer

3–25% soluble coffee solids 0.4–3% glycerol (by weight of sugar)

0.03–0.7% polysorbate (by weight of sugar).

* * * * *